United States Patent
Patel et al.

(10) Patent No.: US 10,680,492 B2
(45) Date of Patent: Jun. 9, 2020

(54) VARIABLE FREQUENCY GENERATOR ROTOR WINDING SUPPORT STRUCTURE

(71) Applicant: Hamilton Sundstrand Corporation, Charlotte, NC (US)

(72) Inventors: Dhaval Patel, Loves Park, IL (US); Andrew P. Grosskopf, Rockford, IL (US); Edward C. Allen, Davis, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 81 days.

(21) Appl. No.: 16/128,212

(22) Filed: Sep. 11, 2018

(65) Prior Publication Data
US 2020/0083776 A1    Mar. 12, 2020

(51) Int. Cl.
*H02K 3/51* (2006.01)
*H02K 5/22* (2006.01)
*H02K 3/52* (2006.01)
*H01R 35/02* (2006.01)
*H02K 3/50* (2006.01)

(52) U.S. Cl.
CPC ............. *H02K 5/225* (2013.01); *H02K 3/51* (2013.01); *H02K 3/527* (2013.01); *H01R 35/02* (2013.01); *H02K 3/50* (2013.01)

(58) Field of Classification Search
CPC ................................. H02K 3/51; H02K 3/527
See application file for complete search history.

(56) References Cited

U.S. PATENT DOCUMENTS 5,111,097 A    5/1992   Londergan et al.
8,018,114 B2   9/2011   Rasmussen et al.

FOREIGN PATENT DOCUMENTS

| EP | 1724904 A2 | 11/2006 |
|---|---|---|
| EP | 3046233 A1 | 7/2016 |
| JP | H0641363 U | 5/1994 |

OTHER PUBLICATIONS

Extended European search report issued in the corresponding EP Application No. 19196793.4, dated Dec. 16, 2019.

*Primary Examiner* — Ramon M Barrera
(74) *Attorney, Agent, or Firm* — Locke Lord LLP; Daniel J. Fiorello; Scott D. Wofsy

(57) ABSTRACT

A variable frequency generator (VFG) rotor can include a plurality of windings configured to form a plurality of magnetic poles, each winding comprising a first winding end and a second winding end, and a first winding support structure comprising a plurality of first winding support segments configured to retain a first portion of each winding, each winding support segment being configured to move radially relative to an axis of rotation of the rotor. The first winding end of each winding extends from each winding support segment. The rotor can include at least one flexible bus bar jumper connected to two first winding ends of adjacent windings and configured to flex with radial movement of the winding support segments of respective windings attached to the flexible bus bar jumper.

20 Claims, 3 Drawing Sheets

VARIABLE FREQUENCY GENERATOR ROTOR WINDING SUPPORT STRUCTURE

BACKGROUND

1. Field

The present disclosure relates to variable frequency generators (VFGs), more specifically to winding support structures for VFGs.

2. Description of Related Art

Traditional variable frequency generator (VFG) rotor main field windings have a limited number of cycles before the pole-to-pole jumper wire fatigues. The root cause of the fatigue is due to the end winding supports shifting radially due to start/stop and high speeds.

Such conventional methods and systems have generally been considered satisfactory for their intended purpose. However, there is still a need in the art for improved pole-to-pole jumper structures. The present disclosure provides a solution for this need.

SUMMARY

In accordance with at least one aspect of this disclosure, a variable frequency generator (VFG) rotor can include a plurality of windings configured to form a plurality of magnetic poles, each winding comprising a first winding end and a second winding end, and a first winding support structure comprising a plurality of first winding support segments configured to retain a first portion of each winding, each winding support segment being configured to move radially relative to an axis of rotation of the rotor. The first winding end of each winding extends from each winding support segment. The rotor can include at least one flexible bus bar jumper connected to two first winding ends of adjacent windings and configured to flex with radial movement of the winding support segments of respective windings attached to the flexible bus bar jumper.

The flexible bus bar jumper can be an elongated conductive member. In certain embodiments, the flexible bus bar jumper can be flat. In certain embodiments, the flexible bus bar jumper can include a bowed shape. In certain embodiments, the flexible bus bar jumper can include a wide base area at each connection with each respective first winding end, and a narrow middle portion in between each connection with each respective first winding end. Any other suitable shape is contemplated herein.

The flexible bus bar jumper can be bolted to each first winding end such that the first winding ends are compressed against the flexible bus bar jumper. Any other suitable connection between the flexible bus bar jumper and one or more of the first winding ends is contemplated herein.

The first winding ends can be at a drive end of the rotor. The at least one flexible bus bar jumper can include two flexible bus bar jumpers at the drive end of the rotor, for example.

The rotor can include a second winding support structure comprising a plurality of second winding support segments configured to retain a second portion of each winding, each second winding support segment configured to move radially relative to an axis of rotation of the rotor. The second winding end of each winding can extend from each second winding support segment. The rotor can include at least one second flexible bus bar jumper connected to two second winding ends of adjacent windings and configured to flex with radial movement of the winding support segments of respective windings attached to the second flexible bus bar jumper.

Each second winding end can be at an anti-drive end of the rotor that is opposite the drive end. In certain embodiments, the anti-drive end can include a single second flexible bus bar jumper that connects two second winding ends together.

The rotor can include a first moveable terminal connected to a second winding end of a first winding of the windings. The rotor can also include a second moveable terminal connected to a second winding of the windings. One of the first and second movable terminals can be an input and the other can be an output, for example, e.g., located on the anti-drive end.

In certain embodiments, each winding can be wound in the same direction. For example, each winding can be wound in a counter clockwise direction.

A variable frequency generator (VFG) can include any suitable embodiment of a VFG rotor disclosed herein. Any other suitable generator/motor structure is contemplated herein.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
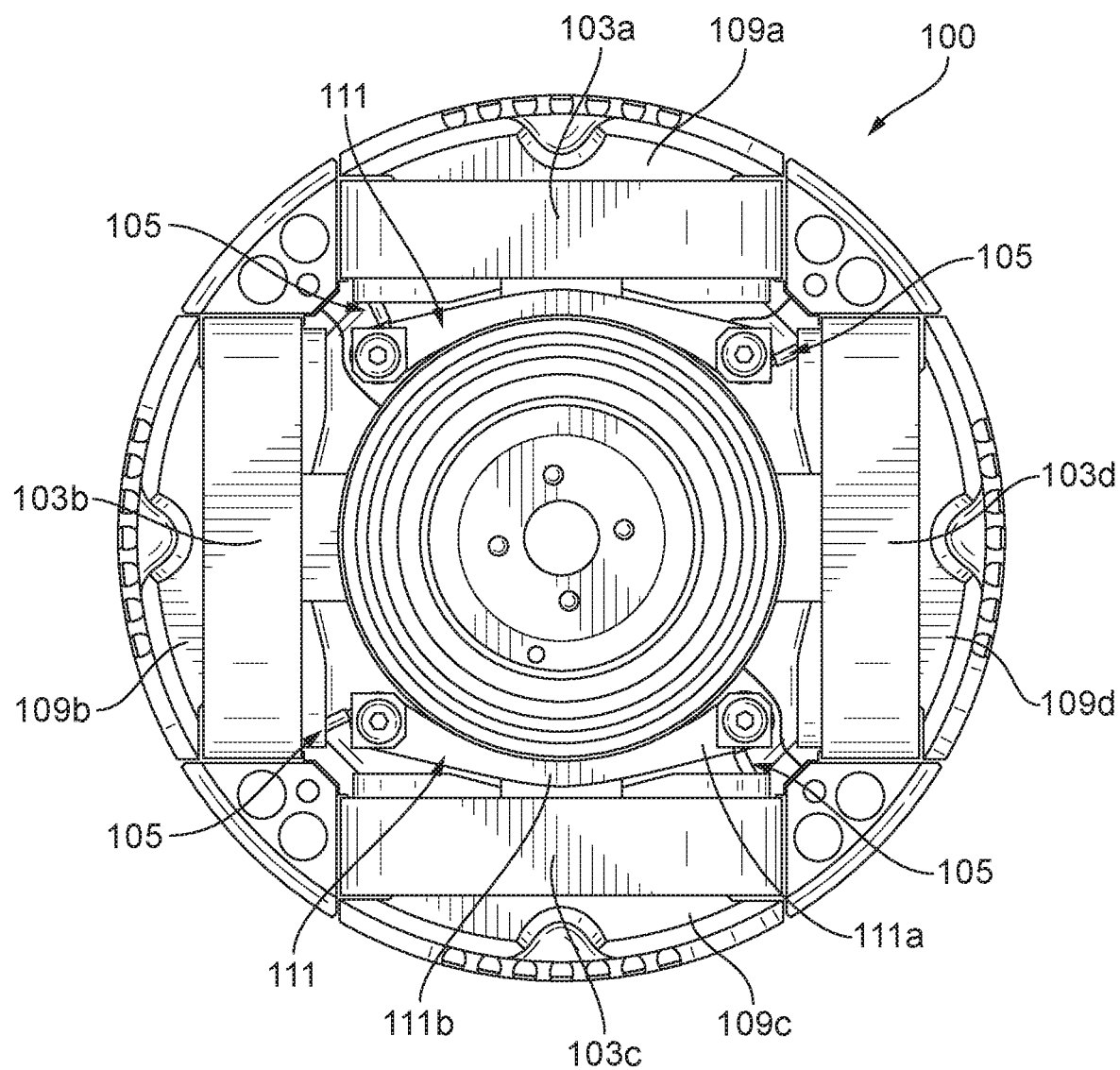
FIG. 1 is a plan view of an end of the embodiment of FIG. 1.

Reference will now be made to the drawings wherein like reference numerals identify similar structural features or aspects of the subject disclosure. For purposes of explanation and illustration, and not limitation, an illustrative view of an embodiment of a rotor in accordance with the disclosure is shown in FIG. 1 and is designated generally by reference character 100. Other embodiments and/or aspects of this disclosure are shown in FIGS. 2 and 3.

Figure 2:
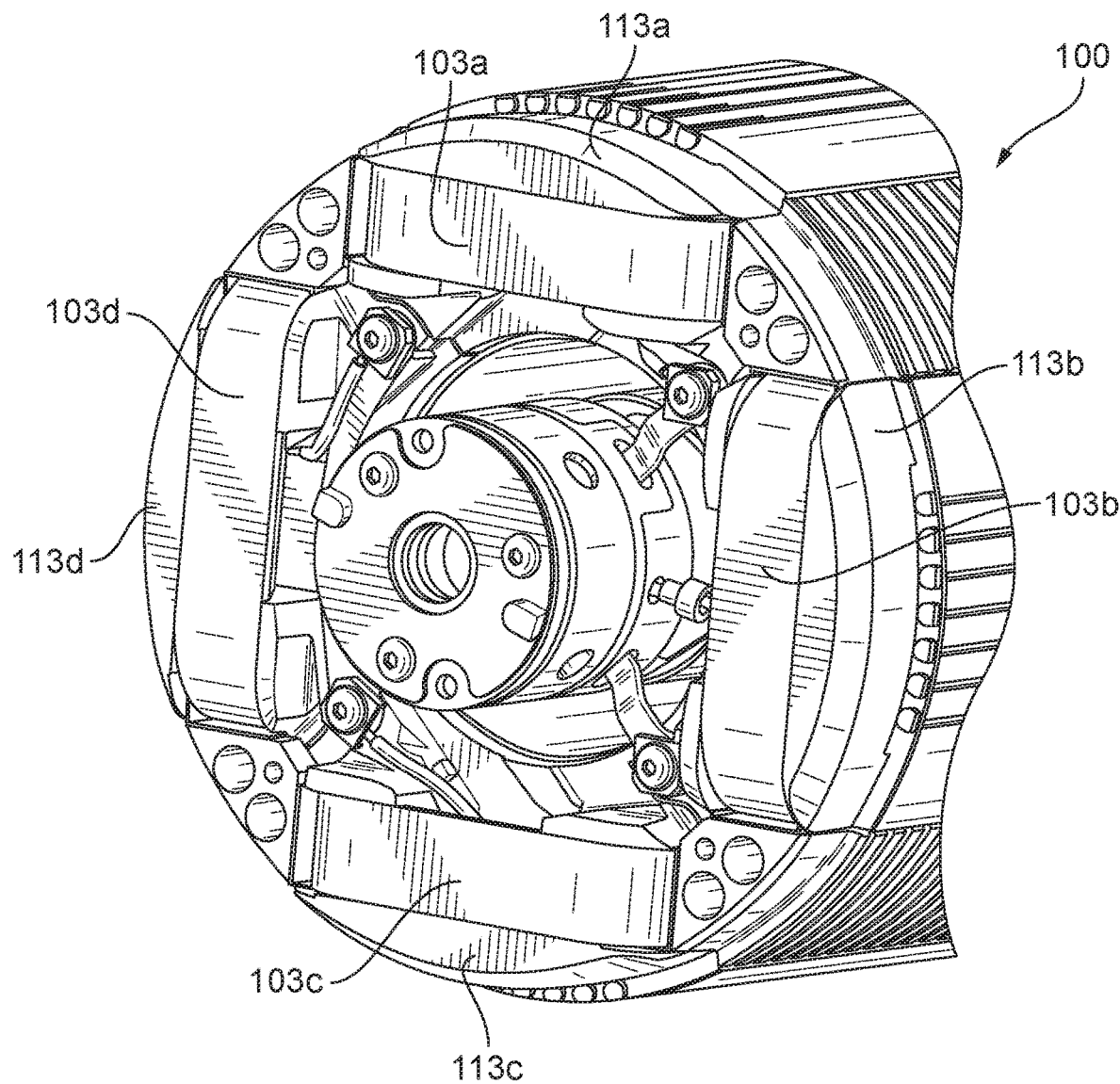
FIG. 2 is a perspective view of an opposite end of an embodiment of a variable frequency generator (VFG) rotor in accordance with this disclosure.
Figure 3:
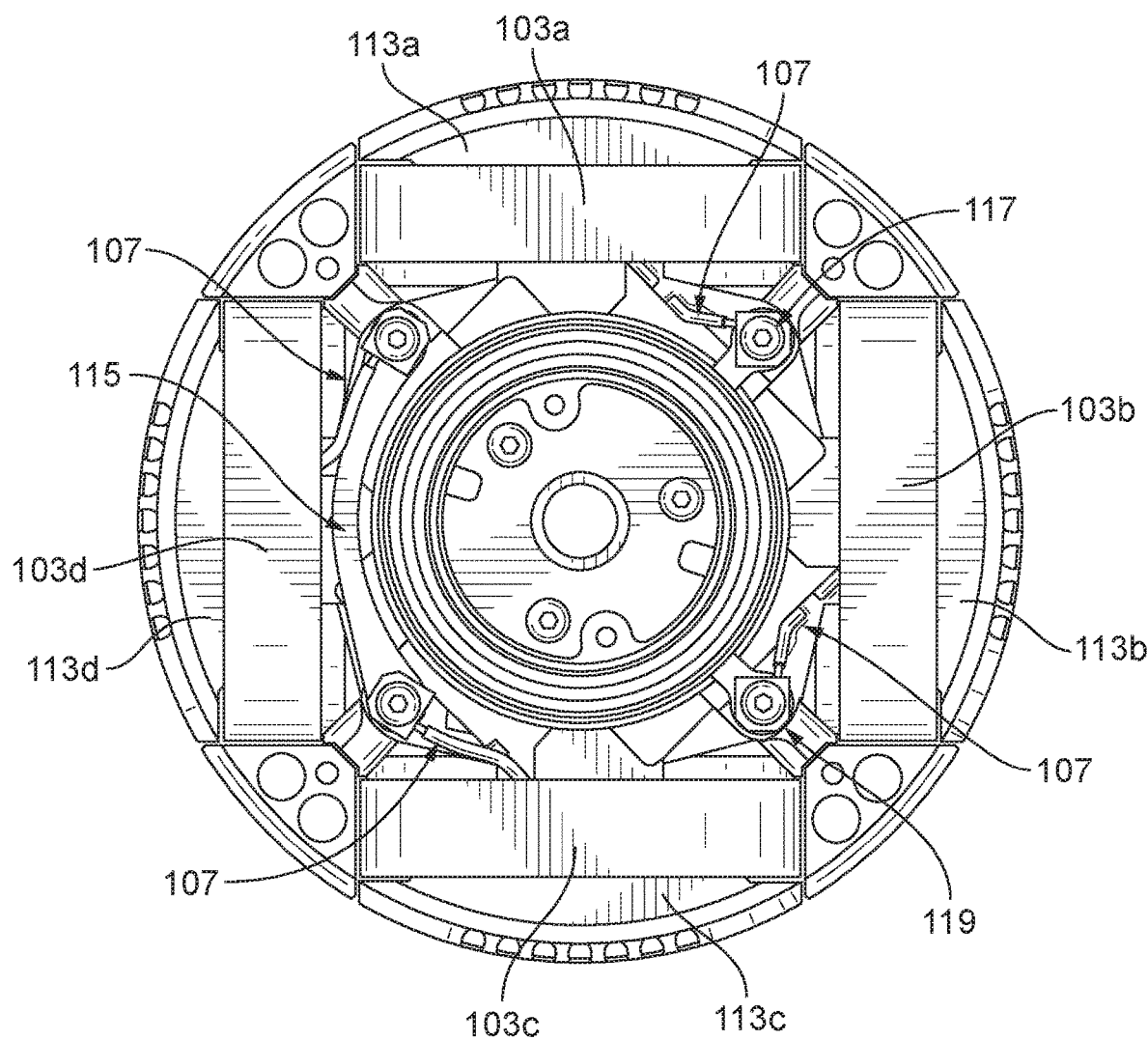
FIG. 3 is a plan view of the end of FIG. 2.

Referring to FIGS. 1-3, a variable frequency generator (VFG) rotor 100 can include a plurality of windings 103a, b, c, d configured to form a plurality of magnetic poles of the VFG rotor 100. Each winding 103a, b, c, d can include a first winding end 105 (e.g., as shown in FIG. 1) and a second winding end 107 (e.g., as shown in FIGS. 2 and 3).

As shown in FIG. 1, the rotor 100 includes a first winding support structure comprising a plurality of first winding support segments 109a, b, c, d configured to retain a first portion of each winding 103a, b, c, d, respectively, at the first end of the rotor 100. Each winding support segment 109a, b, c, d, can be a separate and each is configured to move radially relative to an axis of rotation of the rotor 100 (e.g., outward with rotation of the rotor 100 about its center axis).

The first winding end 105 of each winding extends from each winding support segment 109a, b, c, d.

The rotor 100 can include at least one flexible bus bar jumper 111 connected to two first winding ends 105 of adjacent windings (e.g., of windings 103a and 103d, and windings 103c and 103b) and configured to flex with radial movement of the winding support segments 109a, b, c, d of respective windings 103a, b, c, d attached to the flexible bus bar jumper 111.

The flexible bus bar jumper 111 can be an elongated conductive member. The flexible bus bar jumper 111 can be made of, e.g., aluminum alloy, copper, copper alloy (e.g., high strength copper, aluminum dispersion copper, etc.), and/or any other suitable material.

In certain embodiments, the flexible bus bar jumper 111 can be flat. In certain embodiments, the flexible bus bar jumper 111 can include a bowed shape, e.g., as shown. In certain embodiments, the flexible bus bar jumper 111 can include a wide base area 111a at each connection with each respective first winding end 105, and a narrow middle portion 111b in between each connection with each respective first winding end 105. A ratio of thinness of the middle portion 111b to base area 111a can be selected as a function of speed that the rotor 100 operates. The flexible bus bar jumper 111 can be dimensioned sufficiently large enough to handle the intended current passing through. The flexible bus bar jumper 111 can be optimized for necessary cross-sectional area for current while also being sized to prevent fatigue from use in flexion. Any other suitable shape configured to be flexible is contemplated herein.

As shown, the flexible bus bar jumper 111 can be bolted to each first winding end 105 such that the first winding ends 105 are compressed against the flexible bus bar jumper 111. Any other suitable connection between the flexible bus bar jumper 111 and one or more of the first winding ends 105, e.g., to transfer suitable force between each first winding end 105 and the flexible bus bar jumper 111 is contemplated herein.

The first winding ends 105 can be at a drive end of the rotor 100, as shown in FIG. 1. The at least one flexible bus bar jumper 111 can include two flexible bus bar jumpers 111 at the drive end of the rotor 100, for example, as shown to connect four windings 103a, b, c, d.

Referring additionally to FIGS. 2 and 3, the rotor 100 can include a second winding support structure comprising a plurality of second winding support segments 113a, b, c, d configured to retain a second portion of each winding 103a, b, c, d. Each second winding support segment 113a, b, c, d can be the same as or similar to segments 109a, b, c, d and can be configured to move radially relative to an axis of rotation of the rotor 100. The second winding end 107 of each winding 103a, b, c, d can extend from each second winding support segment 113a, b, c, d. The rotor 100 can include at least one second flexible bus bar jumper 115 connected to two second winding ends 107 of adjacent windings (e.g., windings 103c and 103d as shown). The at least one second flexible bus bar jumper 115 can be the same or similar to the one or more flexible bus bar jumpers 111 and can be configured to flex with radial movement of the winding support segments 113a, b, c, d of respective windings 103a, b, d, c attached to the second flexible bus bar jumper 115.

Each second winding end 107 can be at an anti-drive end of the rotor 100 that is opposite the drive end, e.g., as shown in FIGS. 2 and 3. In certain embodiments, the anti-drive end can include a single second flexible bus bar jumper 115, as shown, that connects two second winding ends 107 together.

The rotor 100 can include a first moveable terminal 117 connected to a second winding end 107 of a first winding, e.g., 103a of the windings 103a, b, c, d. The rotor 100 can also include a second moveable terminal 119 connected to a second winding, e.g., 103b of the windings 103a, b, c, d. One of the first and second movable terminals 117, 119 can be an input (e.g., a DC bus connected to a rotating rectifier) and the other can be an output (e.g., a DC bus connected to the rotating rectifier), for example, e.g., located on the anti-drive end.

In certain embodiments, each winding 103a, b, c, d can be wound in the same direction. For example, each winding 103a, b, c, d can be wound in a counter clockwise direction. It is contemplated that any other suitable winding scheme can be employed (e.g., all clockwise, a mixture of clockwise and counter clockwise).

In accordance with at least one aspect of this disclosure, a variable frequency generator (VFG) can include any suitable embodiment of a VFG rotor, e.g., VFG rotor 100, disclosed herein. Any other suitable generator/motor structure is contemplated herein.

Embodiments include a sealed rotor. In such embodiments, oil can be pumped in and flood the rotor with cooling. In traditional rotor designs, during operation, the end winding supports slide out radially. This occurs because of tolerances and during operation the end plates flex out radially. From tolerance analysis and structural analysis, the end winding supports can shift about 0.010 inches to about 0.020 inches. In traditional rotors, each end winding support slides outwards and can cause the pole to pole jump to break. Also, the traditional main field winding on all four poles is wound with one piece of wire. The north-south pole pairs are created by winding the first pole in the counter-clockwise, and then the second pole is wound clockwise. This pattern is repeated for the additional poles in traditional rotors.

In certain embodiments of this disclosure, the lead wires from each pole are truncated on the end winding support that the respective winding is on. As a result, as the winding support and wire bundle shift, the lead wire shifts with it.

Embodiments disclosed above eliminate pole to pole jumps that can break and utilize a jumper bus bar that can flex. Embodiments can include separate poles connected together, wound in a single direction, which can improve manufacturability. Embodiments also improve the lifespan of rotors.

Any suitable combination(s) of any disclosed embodiments and/or any suitable portion(s) thereof are contemplated herein as appreciated by those having ordinary skill in the art.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A variable frequency generator (VFG) rotor, comprising:
   a plurality of windings configured to form a plurality of magnetic poles, each winding comprising a first winding end and a second winding end;
   a first winding support structure comprising a plurality of first winding support segments configured to retain a first portion of each winding, each winding support segment configured to move radially relative to an axis of rotation of the rotor, the first winding end of each winding extending from each winding support segment; and
   at least one flexible bus bar jumper connected to two first winding ends of adjacent windings and configured to flex with radial movement of the winding support segments of respective windings attached to the flexible bus bar jumper.

2. The rotor of claim 1, wherein the flexible bus bar jumper is an elongated conductive member.

3. The rotor of claim 2, wherein the flexible bus bar jumper is flat.

4. The rotor of claim 2, wherein the flexible bus bar jumper includes a wide base area at each connection with each respective first winding end, and a narrow middle portion in between each connection with each respective first winding end.

5. The rotor of claim 4, wherein the flexible bus bar jumper is bolted to each first winding end such that the first winding ends are compressed against the flexible bus bar jumper.

6. The rotor of claim 1, wherein the flexible bus bar jumper includes a bowed shape.

7. The rotor of claim 1, wherein the first winding ends are at a drive end of the rotor, wherein the at least one flexible bus bar jumper includes two flexible bus bar jumpers at the drive end of the rotor.

8. The rotor of claim 7, further comprising:
   a second winding support structure comprising a plurality of second winding support segments configured to retain a second portion of each winding, each second winding support segment configured to move radially relative to an axis of rotation of the rotor, the second winding end of each winding extending from each second winding support segment; and
   at least one second flexible bus bar jumper connected to two second winding ends of adjacent windings and configured to flex with radial movement of the winding support segments of respective windings attached to the second flexible bus bar jumper.

9. The rotor of claim 8, wherein each second winding end is at an anti-drive end of the rotor that is opposite the drive end, further comprising a flexible bus bar jumper connecting two second winding ends together.

10. The rotor of claim 9, further comprising a first moveable terminal connected to a second winding end of a first winding of the windings and a second moveable terminal connected to a second winding of the windings, wherein the one of the first and second movable terminals is an input and the other is an output.

11. The rotor of claim 1, wherein each winding is wound in the same direction.

12. The rotor of claim 11, wherein each winding is wound in a counter clockwise direction.

13. A variable frequency generator (VFG), comprising:
   a VFG rotor including:
      a plurality of windings configured to form a plurality of magnetic poles, each winding comprising a first winding end and a second winding end;
      a first winding support structure comprising a plurality of first winding support segments configured to retain a first portion of each winding, each winding support segment configured to move radially relative to an axis of rotation of the rotor, the first winding end of each winding extending from each winding support segment; and
      at least one flexible bus bar jumper connected to two first winding ends of adjacent windings and configured to flex with radial movement of the winding support segments of respective windings attached to the flexible bus bar jumper.

14. The VFG of claim 13, wherein the flexible bus bar jumper is an elongated conductive member.

15. The VFG of claim 14, wherein the flexible bus bar jumper is flat.

16. The VFG of claim 14, wherein the flexible bus bar jumper includes a wide base area at each connection with each respective first winding end, and a narrow middle portion in between each connection with each respective first winding end.

17. The VFG of claim 15, wherein the flexible bus bar jumper is bolted to each first winding end such that the first winding ends are compressed against the flexible bus bar jumper.

18. The VFG of claim 12, wherein the flexible bus bar jumper includes a bowed shape.

19. The VFG of claim 12, wherein the first winding ends are at a drive end of the rotor, wherein the at least one flexible bus bar jumper includes two flexible bus bar jumpers at the drive end of the rotor.

20. The VFG of claim 19, further comprising:
   a second winding support structure comprising a plurality of second winding support segments configured to retain a second portion of each winding, each second winding support segment configured to move radially relative to an axis of rotation of the rotor, the second winding end of each winding extending from each second winding support segment; and
   at least one second flexible bus bar jumper connected to two second winding ends of adjacent windings and configured to flex with radial movement of the winding support segments of respective windings attached to the second flexible bus bar jumper.

* * * * *